(12) United States Patent
Chevalier et al.

(10) Patent No.: US 8,308,143 B2
(45) Date of Patent: Nov. 13, 2012

(54) METHOD FOR STIRRING A LIQUID AND FOR INJECTING A GAS INTO THIS LIQUID, SUITABLE FOR SHALLOW BASINS

(75) Inventors: Gilbert Chevalier, Voisins le Bretonneaux (FR); Alain Villermet, Viroflay (FR); Christian Larquet, Guyancourt (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 13/401,421

(22) Filed: Feb. 21, 2012

(65) Prior Publication Data

US 2012/0206990 A1    Aug. 16, 2012

Related U.S. Application Data

(63) Continuation of application No. 11/407,778, filed on Apr. 19, 2006.

(30) Foreign Application Priority Data

Apr. 19, 2005 (FR) ..................................... 05 50985

(51) Int. Cl.
*B01F 3/04* (2006.01)
(52) U.S. Cl. .............................. 261/28; 261/93; 261/123
(58) Field of Classification Search .................... 261/28, 261/29, 91, 93, 123, DIG. 71
See application file for complete search history.

(56) References Cited

U.S. PATENT DOCUMENTS

| | | | | |
|---|---|---|---|---|
| 4,265,739 A * | 5/1981 | Dalton | .......................... | 209/169 |
| 4,290,885 A * | 9/1981 | Kwak | ........................... | 210/197 |
| 4,310,437 A * | 1/1982 | Schreiber | ....................... | 96/177 |
| 4,818,404 A * | 4/1989 | McDowell | .................... | 210/603 |
| 6,109,449 A * | 8/2000 | Howk et al. | ................... | 209/169 |
| 6,142,458 A * | 11/2000 | Howk | .............................. | 261/93 |
| 6,270,061 B1 * | 8/2001 | Bouquet et al. | ................. | 261/87 |
| 6,460,830 B1 * | 10/2002 | Boulant | ....................... | 261/36.1 |
| 8,146,894 B2 * | 4/2012 | Hills | ............................... | 261/86 |
| 2009/0206497 A1 * | 8/2009 | Nelson | ......................... | 261/36.1 |
| 2010/0187701 A1 * | 7/2010 | Johnson et al. | ................. | 261/93 |
| 2010/0201008 A1 * | 8/2010 | Hoefken | ......................... | 261/93 |

FOREIGN PATENT DOCUMENTS

| | | | |
|---|---|---|---|
| CH | 294 349 | * | 11/1953 |
| EP | 0 995 485 | * | 4/2000 |
| GB | 1 221 022 | * | 2/1971 |

* cited by examiner

*Primary Examiner* — Charles Bushey
(74) *Attorney, Agent, or Firm* — Christopher Cronin; Allen E. White

(57) ABSTRACT

The invention relates to a device for stirring a liquid in a reactor and for injecting a gas into the said liquid in order to form a gas-liquid dispersion, comprising a) a drive device (1) positioned above the reactor, provided with a vertical output shaft (2) fitted at its lower end with at least one axial flow rotor (4) immersed in the liquid, b) means for introducing gas (3 and 7) above the axial flow rotor (4), c) a deflector (5) placed above the axial flow rotor (4) preventing the gas-liquid dispersion from rising, and d) a deflector (6) placed below the axial flow rotor (4) converting the axial flow of the said axial flow rotor into a radial flow. This device may be used in shallow basins.

13 Claims, 2 Drawing Sheets

Figure 1:
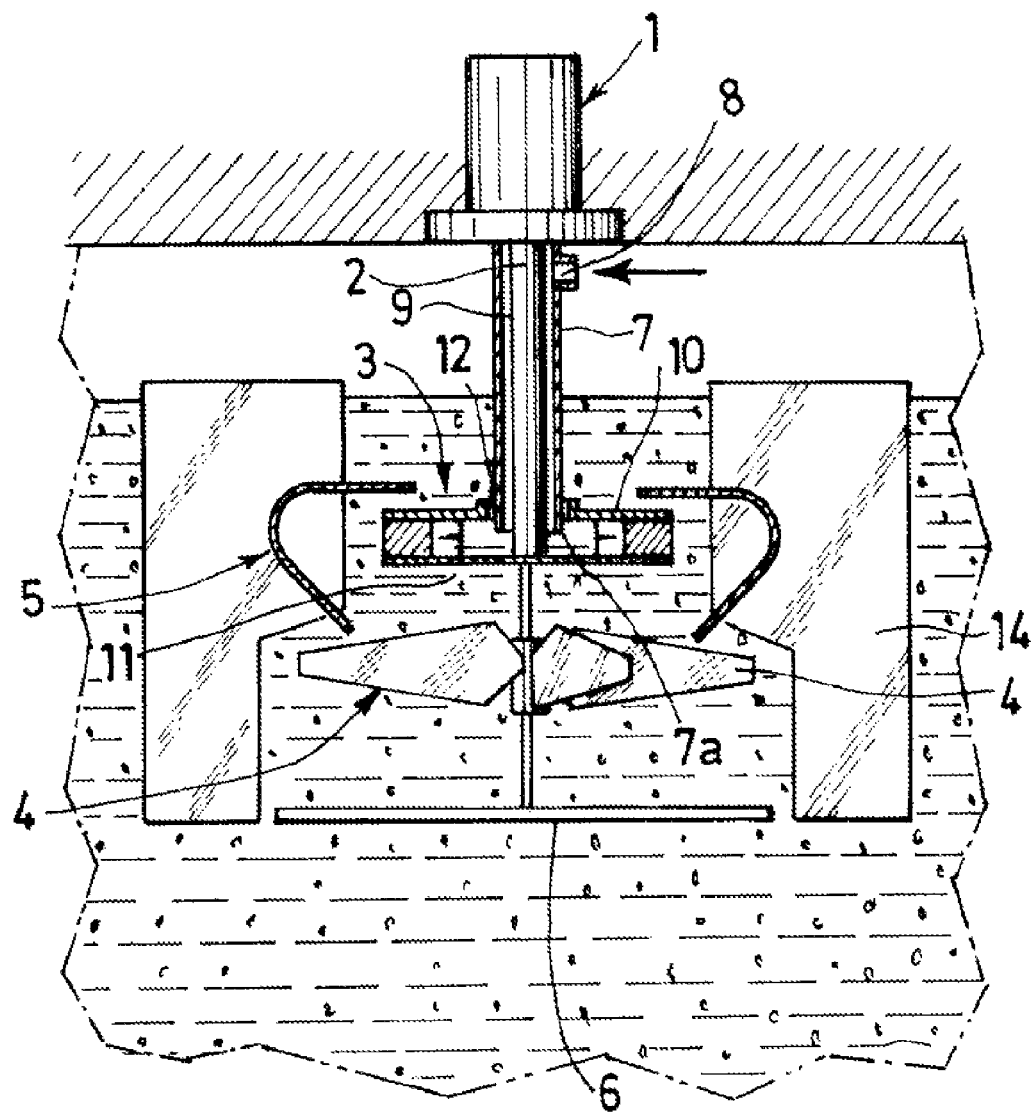

METHOD FOR STIRRING A LIQUID AND FOR INJECTING A GAS INTO THIS LIQUID, SUITABLE FOR SHALLOW BASINS

CROSS REFERENCE TO RELATED APPLICATIONS

This application is a continuation of U.S. patent application 11/407,778, filed 19 Apr. 2006, which claims the benefit of priority under 35 U.S.C. § 119 (a) and (b) to French Application No. 0550985, filed Apr. 19, 2005, the entire contents of which are incorporated herein by reference.

BACKGROUND

The present invention relates to a device for stirring a liquid in a reactor and for injecting a gas into this liquid.

Document EP-A1-0 995 485 describes a device for stirring a liquid in a reactor or basin and for injecting a gas into this liquid. This device comprises a motor for driving a vertical shaft positioned above the reactor. The shaft of the motor carries and drives at its lower end a propeller immersed in the liquid. It also carries and drives a self-aspirating turbine placed between the surface of the liquid and the propeller. The self-aspirating turbine is connected to a gas source, generally an oxygenated gas, so that when it is driven by the shaft of the motor, it draws in at the same time gas and the liquid in which it is immersed, forming in this way a gas-liquid dispersion. The gas-liquid dispersion generated by the self-aspirating turbine is directed towards the propeller with the aid of an annular shell forming a deflector which envelops the self-aspirating turbine.

In practice, the pumping power of the propeller produces descending currents of liquid and gas that can reach more than 7 meters deep. Also, when the bottom of the basin is situated at 7 meters or less, the current strikes the bottom. This is of no importance if the walls and bottom of the reactor are made of concrete or if the depth exceeds 3 meters. On the contrary, this makes it possible to disturb the sludge which tends to accumulate at the bottom of the reactor. On the other hand, some reactors possess walls and a bottom made of geotextile membranes or clay, which are very sensitive to abrasion. In general, these basins are not very deep (1.5 to 3 meters). The impact of a powerful flow erodes and hollows out such bottoms, until the waterproofness of the reactor is endangered. Moreover, moving large quantities of clay disturbs the settling of sludge downstream from the aeration basin.

The object of the present invention is to provide a device for stirring a liquid in a reactor and for injecting a gas into this liquid, in which a powerful axial flow is created, that can be employed in shallow basins or in basins with friable walls.

With this objective, the invention concerns a device for stirring a liquid in a reactor and for injecting a gas into the said liquid in order to form a gas-liquid dispersion, comprising:
a drive device positioned above the reactor, provided with a vertical output shaft fitted at its lower end with at least one axial flow rotor immersed in the liquid,
means for introducing gas above the axial flow rotor,
a deflector placed above the axial flow rotor preventing the gas-liquid dispersion from rising,
and comprising a deflector placed below the axial flow rotor converting the axial flow of the said rotor into a radial flow.

Figure 2:
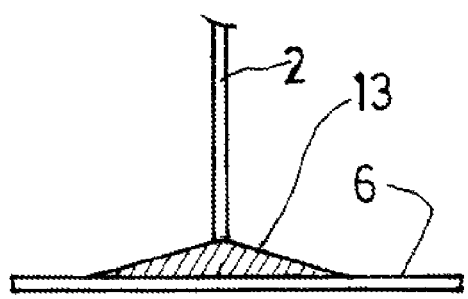
Figure 3:
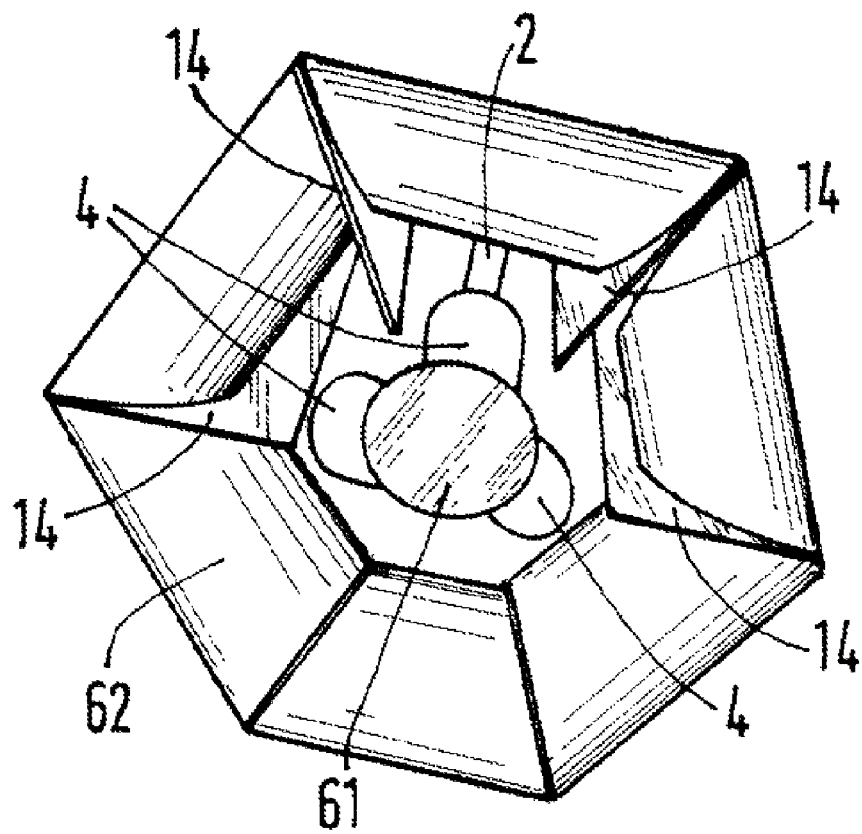
Figure 4:
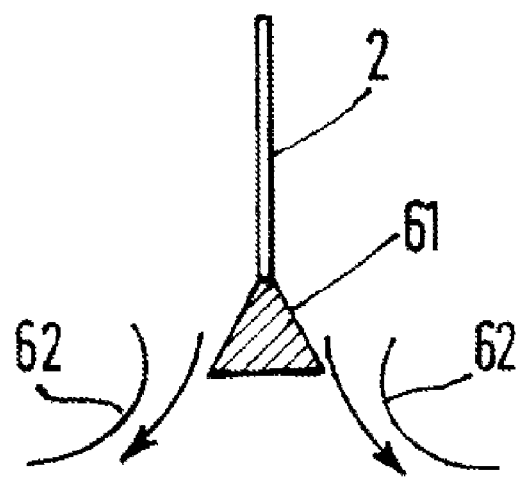

Other features and advantages of the invention will become apparent on reading the following description. Forms and embodiments of the invention are given by way of non-limiting examples, illustrated by the appended drawings in which:

FIG. 1 is a view of a device according to the invention,
FIG. 2 is a view of the deflector placed below the axial flow rotor and converting the axial flow of the said rotor into a radial flow that can be used in the device according to the invention,
FIG. 3 is a view from below of a device according to the invention,
FIG. 4 is a cross section of the deflector used in FIG. 3.

From now on, the term "reactor" signifies a natural "basin" as well as "reservoir" with walls that are more or less near to each other and with a more or less closed cover.

The invention therefore relates to a device for stirring a liquid in a reactor and for injecting a gas into the said liquid in order to form a gas-liquid dispersion, comprising:
a drive device positioned above the reactor, provided with a vertical output shaft fitted at its lower end with at least one axial flow rotor immersed in the liquid,
means for introducing gas above the axial flow rotor,
a deflector placed above the axial flow rotor preventing the gas-liquid dispersion from rising,
and comprising a deflector placed below the axial flow rotor converting the axial flow of the said rotor into a radial flow.

According to the invention, the stirring device comprises a drive device, for example a motor, positioned above the surface of the liquid, provided with a rotary output shaft extending vertically and partially immersed in the liquid. The shaft carries at its lower end an axial flow rotor, which may be a propeller or a screw, immersed in the liquid and generally directing the liquid towards the bottom of the basin. The device also includes means for introducing gas above the axial flow rotor and in the liquid so that the gas and liquid are entrained by the axial flow rotor and a gas-liquid dispersion is created. The device finally includes a deflector placed above the axial flow rotor shaped so that it prevents the gas-liquid dispersion rising. This shape can enable the axial flow to be directed towards the bottom of the basin and/or can serve to collect the gas, preventing the latter from escaping to the surface of the basin. The essential feature of the invention lies in the fact that a supplementary deflector is placed below the axial flow rotor and has a shape such that it converts the axial flow created by the rotor into a radial flow.

According to a first variant of the device according to the invention, the deflector placed below the axial flow rotor may be a plate that is generally circular. This plate is preferably centered on the output shaft. It may be advantageous to place this deflector below the axial flow rotor at the greatest possible distance from the said rotor so as to make best use of the depth available under the stirring device. In general, the surface area of the deflector placed below the axial flow rotor is increased as a function of the distance between this deflector and this axial flow rotor. As an indication, for a deflector—axial flow rotor distance less than 200 mm, it is sufficient for the surface area of the deflector to be at least of the order of the area projected onto it by the axial flow rotor. The surface area of the deflector may also be extended to the area projected onto it by the overall stirring device.

A deflector cone or prism may be centered on the plate. The angle of the cone or prism may be optimized according to the distance between the deflector placed below the axial flow rotor and the said axial flow rotor.

From a practical point of view, the deflector placed below the axial flow rotor may be fixed to the output shaft of the drive device. When the device operates, the deflector placed below the axial flow rotor is then also driven by the motor. This implementation has the advantage of making it possible to modify rapidly a device of the prior art so as to adapt it to shallow basins since it is sufficient to add a deflector to the drive shaft.

According to a second variant of the invention, the deflector placed below the axial flow rotor consists of:
- a central plate, and
- surface portions distributed angularly around the central plate and having a progressive profile diverging outwards and towards the bottom of the reactor.

The divergent profile of the surface portions is advantageously calculated so as to offer a minimum passage section under the axial flow rotor, the said section widening downwards. This minimum section may represent 1.5 to 3 times the projected section of the axial flow rotor. The shape of the divergent profile makes it possible to force the flow of the gas/liquid dispersion to surge between the surface portions and the central shaft of the rotor. The diameter of the circular path taken by the surface portions is preferably not less than the diameter of the axial flow rotor.

According to this variant, the deflector then consists of two parts: the central plate and the surface portions angularly distributed around the plate.

The central plate is preferably circular. It may be fixed to the output shaft of the drive device as for the first variant. A deflector cone may advantageously replace the central plate. Surface portions angularly distributed around the plate are situated at a distance from the central plate or cone. According to the invention, these surface portions have a progressive profile diverging outwards and towards the bottom of the reactor. Thus, in cross section along a plane passing through the vertical output shaft, these surfaces have a profile that deviates towards the outside and bottom of the reactor. This profile is generally curved so as to generate a Coanda-type effect on any rapid flow circulating tangentially to the inlet of the profile. By combining these two parts of the rotor, the axial flow coming from the axial flow rotor is redirected by the central plate or cone tangentially to the profile described by the previously described surfaces. It is pressed against the surface portions angularly distributed around the central plate or cone. The Coanda effect obtained in this way presses the flow of the gas/liquid dispersion against the surface portions. This flow is released at the end of the profile at the angle defined by this. The end of the profile is preferably horizontal so as to obtain a radial flow directed towards the vertical walls of the reactor.

This second variant makes it possible to limit pressure loss when the axial flow comes again into contact with the deflector and makes the flow uniform. The speed of the liquid redirected by the deflector is very rapid and the flow rate is high and consequently operation of the axial flow rotor is not hindered by the added deflector. The conditions for transferring gas into the liquid remain optimum.

According to the angle at the end of the profile enabling the Coanda effect to be generated, radial ejection of the flow may be controlled in relation to the vertical. It is possible in this way to give better distribution of the flow in the basin.

According to the preferred embodiment of the invention, the device has means for introducing gas above the special axial flow rotor, which consists of:
- a self-aspirating turbine immersed in the reactor, placed above the axial flow rotor and which can be driven by the output shaft, and
- a cylinder coaxially enveloping the output shaft, the lower end of which emerges in the turbine and the upper end of which is connected in a sealed manner to the drive device and is drilled with an opening for injecting a gas into an annular gap delimited by the shaft and the cylinder, the turbine consisting of two superimposed discs and an assembly of radial blades arranged between the discs and attached thereto, the upper disc being drilled with a central hole into which the lower end of the cylinder enters which delimits, with the edge of the said hole, a space that is at least partially annular, through which liquid is drawn into the turbine.

FIG. 1 enables a device according to the present invention to be characterized. The device comprises a drive device 1, for example a motor, positioned above the surface of the liquid, provided with a rotary output shaft 2 extending vertically and partially immersed in the liquid. The shaft 2 carries at its lower end an axial flow rotor 4, a propeller, immersed in the liquid. The shaft 2 also carries, positioned between the propeller 4 and the surface of the liquid, a self-aspirating turbine 3 which is consequently immersed in the reactor and is driven by the output shaft 2 at the same speed as the propeller 4. The output shaft 2 is enveloped coaxially by a cylinder 7 connected at its upper end to the drive device 1, with the interposition of a sealing device, and of which the lower end 7a emerges in the turbine 3 coaxially to the shaft 2. In the upper end of the cylinder 7, an opening 8 is drilled for injecting a gas into the annular gap 9 delimited by the shaft 2 and by the cylinder 7. The system for injecting gas into the orifice 8 is not shown. The auto-aspirating turbine 3 consists of two discs 10, 11 placed horizontally, and an assembly of radial blades, placed between the discs 10, 11 and attached thereto. A first deflector 5 is placed above the turbine 3 and the axial flow rotor 4. A second deflector 6 is placed on the shaft 2 below the axial flow propeller 4. The device of FIG. 1 also includes counter-blades 14 for directing the different flows so as to maximize performance in terms of transfer and stirring.

FIG. 2 illustrates a deflector 6 designed to be placed below the axial flow rotor having the form of a plate, centered on the output shaft 2, and at the centre of which a deflector cone 13 is placed.

FIG. 3 illustrates a device according to the invention seen from below. This device is fitted with a deflector 61, 62 placed below the axial flow rotor 4 of which three blades may be identified on the drawing. This deflector consists of a central circular plate 61, and surface portions 62 angularly distributed around the central circular plate 61 and having a progressive profile diverging outwards. This special shape brings about a Coanda-type effect on any flow surging tangentially to the profile described by the surface portions 62. These surface portions 62 are fixed to the counter-blades 14 of the stirring device.

FIG. 4 is a cross section along the axis xx' of the deflector of FIG. 3: the deflector cone centered on the central plate may be observed as well as the profile of the surface portions 62 angularly distributed around the central plate, enabling the Coanda effect to be generated. The arrows represent the current of the flow along the central plate or deflector cone 61 and the portions angularly distributed around the central plate or cone.

By putting a device such as previously described into practice, the axial flow of the axial flow rotor is diverted and impact of the axial flow on the bottom of the basin is prevented.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for adding a gas to a liquid in a reactor comprising the steps of stirring the liquid in the reactor and injecting the gas into the liquid to form a gas-liquid dispersion, the steps being performed by a gas-liquid dispersion device comprising:
   a) a drive device positioned above the reactor, provided with a vertical output shaft fitted at its lower end with at least one axial flow rotor immersed in the liquid;
   b) an injection device configured to perform the injecting step such that the gas is introduced above the axial flow rotor;
   c) a deflector placed above the axial flow rotor preventing the gas-liquid dispersion from rising; and
   d) a deflector placed below the axial flow rotor and configured to convert the axial flow of the said rotor into a radial flow,
   the method further comprising the step of positioning the gas-liquid dispersion device three meters or less above a floor of the reactor wherein the reactor comprises an abrasion sensitive floor that would erode if the abrasion sensitive floor were subjected to an axial flow of the gas-liquid dispersion from the axial flow rotor.

2. The method of claim 1, characterized in that the deflector placed below the axial flow rotor is a plate.

3. The method of claim 2, characterized in that the plate is centered on the output shaft.

4. The method of claim 2, characterized in that a deflector cone is centered on the plate.

5. The method of claim 2, characterized in that a deflector prism is centered on the plate.

6. The method of claim 1, characterized in that the surface area of the deflector placed below the axial flow rotor is extended to the area projected onto it by the stirring device.

7. The method of claim 1, characterized in that the deflector placed below the axial flow rotor is fixed to the output shaft of the drive device.

8. The method of claim 1, characterized in that the deflector placed below the axial flow rotor consists of:
   a) a central plate; and
   b) surface portions distributed angularly around the central circular plate and having a progressive profile diverging outwards and towards the bottom of the reactor.

9. The method of claim 8, characterized in that the divergent progressive profile of the surface portions causes a Coanda effect on any flow surging tangentially in the section described by the divergent progressive profile.

10. The method of claim 8, characterized in that the central plate is fixed to the output shaft of the drive device.

11. The method of claim 8, characterized in that a deflector cone is centered on the central plate.

12. The method of claim 1 wherein the bottom of the reactor is made of geotextile membranes or clay.

13. The method of claim 12 wherein the liquid in the reactor has a depth of three meters or less.

* * * * *